(12) United States Patent
Morimoto et al.

(10) Patent No.: US 8,549,037 B2
(45) Date of Patent: Oct. 1, 2013

(54) FORENSIC SYSTEM, FORENSIC METHOD, AND FORENSIC PROGRAM

(75) Inventors: Masahiro Morimoto, Tokyo (JP); Yoshikatsu Shirai, Tokyo (JP); Hideki Takeda, Tokyo (JP); Masatoshi Ohno, Tokyo (JP)

(73) Assignee: UBIC, Inc. (JP)

( * ) Notice: Subject to any disclaimer, the term of this patent is extended or adjusted under 35 U.S.C. 154(b) by 0 days.

(21) Appl. No.: 13/514,981

(22) PCT Filed: Jul. 27, 2011

(86) PCT No.: PCT/JP2011/067055
§ 371 (c)(1),
(2), (4) Date: Jun. 9, 2012

(87) PCT Pub. No.: WO2012/014918
PCT Pub. Date: Feb. 2, 2012

(65) Prior Publication Data
US 2012/0290578 A1    Nov. 15, 2012

(30) Foreign Application Priority Data

Jul. 28, 2010   (JP) .................................. 2010-169173

(51) Int. Cl.
*G06F 7/00*    (2006.01)
*G06F 17/30*   (2006.01)

(52) U.S. Cl.
USPC .......................................... 707/780; 707/736

(58) Field of Classification Search
None
See application file for complete search history.

(56) References Cited

U.S. PATENT DOCUMENTS

| 6,493,706 | B1 * | 12/2002 | Mead et al. ........................... 1/1 |
| 7,716,196 | B2 * | 5/2010  | Ghielmetti et al. ........... 707/705 |
| 7,890,493 | B2 * | 2/2011  | Chen ............................. 707/713 |
| 8,171,041 | B2 * | 5/2012  | Bennett ......................... 707/760 |
| 8,214,391 | B2   | 7/2012  | Denesuk et al. |
| 8,412,628 | B2   | 4/2013  | Beach et al. |
| 2002/0138250 | A1 * | 9/2002 | Okura et al. ..................... 704/2 |
| 2003/0182310 | A1 * | 9/2003 | Charnock et al. .......... 707/104.1 |

(Continued)

FOREIGN PATENT DOCUMENTS

| JP | 06-044325 | 2/1994 |
| JP | 11-272671 | 10/1999 |

(Continued)

OTHER PUBLICATIONS

JP 11-272671 Shimazu Miwako and Yoshimura Yumiko Machine Translation of the applicant's IDS.*

(Continued)

*Primary Examiner* — Polina Peach (57) ABSTRACT

Embodiments of the inventive concept reduce the burden of creating litigant sources of evidence or other evidentiary materials in connection with litigation in a court of law. Designation of at least one document file included in digital document information is accepted and designation of a language into which the designated document file is translated is accepted. The document file, the designation of which is accepted, is translated into the language the designation of which is accepted. A common document file representing the same content as that of the designated document file is extracted from digital document information recorded in a recording unit. Translation-related information representing that the extracted common document file is translated by invoking a translated content of the translated document file is generated, and, based on the translation-related information, a litigant-related document file is output.

20 Claims, 7 Drawing Sheets

(56) References Cited

U.S. PATENT DOCUMENTS

| | | | |
|---|---|---|---|
| 2004/0006594 | A1 | 1/2004 | Boyer et al. |
| 2005/0086179 | A1 | 4/2005 | Mehmet |
| 2006/0004702 | A1* | 1/2006 | St. John et al. ............ 707/2 |
| 2006/0129445 | A1 | 6/2006 | Mccallum |
| 2007/0130100 | A1 | 6/2007 | Miller |
| 2007/0150259 | A1* | 6/2007 | Akahane et al. ............ 704/2 |
| 2008/0208838 | A1 | 8/2008 | Friedlander et al. |
| 2009/0150168 | A1 | 6/2009 | Schmidt |
| 2009/0165026 | A1 | 6/2009 | Paknad et al. |
| 2009/0276406 | A1* | 11/2009 | Kelley ............ 707/3 |
| 2009/0292743 | A1 | 11/2009 | Bigus et al. |
| 2009/0326917 | A1* | 12/2009 | Hegenberger ............ 704/7 |
| 2010/0150453 | A1* | 6/2010 | Ravid et al. ............ 382/218 |
| 2010/0250573 | A1 | 9/2010 | Mayer et al. |
| 2011/0098999 | A1* | 4/2011 | Amini et al. ............ 704/2 |
| 2011/0286584 | A1* | 11/2011 | Angel et al. ............ 379/88.02 |

FOREIGN PATENT DOCUMENTS

| | | |
|---|---|---|
| JP | 2003-288365 | 10/2003 |
| JP | 2003-345798 | 12/2003 |
| JP | 2006-178521 | 7/2006 |
| JP | 2007-148731 | 6/2007 |
| JP | 2007172221 A | 7/2007 |
| JP | 2007334412 A | 12/2007 |
| JP | 2008097484 A | 4/2008 |
| JP | 2009015659 A | 1/2009 |
| JP | 2009205220 A | 9/2009 |
| JP | 2009-276862 | 11/2009 |
| JP | 2009-294896 | 12/2009 |

OTHER PUBLICATIONS

Li et al. "Advanced teaming algorithms for cross-language patent retrieval and classification", Apr. 27, 2007, Information Processing & Management, Elsevier, Barking, G8, vol. 43, pp. 1183-1199.*

Rigutini et al. "An EM based training algorithm for Cross-Language Text Categorization", 2005, IEEE, pp. 529-535.*

Juan Jose Garda Adeva et al. "Multilingual Approaches to Text Categorisation", 2006, University of Sydney.*

International Search Report dated Oct. 4, 2011 corresponding to PCT/JP2011/067055.

Written Opinion dated Oct. 10, 2011 corresponding to PCT/JP2011/067055.

International Search Report dated Apr. 11, 2011 corresponding to International Patent Application No. PCT/JP2011/057141.

International Search Report dated Apr. 19, 2011 corresponding to International Application No. PCT/JP2011/057142.

Written Opinion dated Apr. 11, 2011 corresponding to International Application No. PCT/JP2011/057142.

Written Opinion dated Apr. 11, 2011 corresponding to International Patent Application No. PCT/JP2011/057141.

\* cited by examiner

The translation-related information

Numbers of target files : 6
Numbers of outputting files : 3

| Output | doc_id | File name | Path | Hash | Language |
|---|---|---|---|---|---|
| ○ | 1 | 1.doc | ¥¥fileserver1¥dir1 | abcdefg1234567890abcdef | English・French |
|  | 2 | 1-1.doc | ¥¥fileserver1¥¥;6 | abcdefg1234567890abcdef | English・French |
|  | 3 | 1-2.doc | ¥¥fileserver1¥;3 | abcdefg1234567890abcdef | English・French |
| ○ | 4 | 222.xls | ¥¥fileserver1¥dir1 | 000000111122223334445 | French |
| ○ | 5 | 3.pdf | ¥¥fileserver1¥dir1 | aaaaaaaaaaaaaaaaa | German |
|  | 6 | 3-1.pdf | ¥¥fileserver1¥dir1 | aaaaaaaaaaaaaaaaa | German |
|  | 7 | testA.eml | ¥¥fileserver1¥dir1 |  | German |
| ○ | 8 | testB.eml | ¥¥fileserver1¥dir1 |  |  |

FORENSIC SYSTEM, FORENSIC METHOD, AND FORENSIC PROGRAM

CROSS-REFERENCE TO RELATED APPLICATION

This application is a U.S. National Phase Application of PCT International Application PCT/JP2011/067055, filed Jul. 27, 2011, which claims priority to Japanese Patent Application No. 2010-169173, filed on Jul. 28, 2010, the disclosure of which is incorporated herein by reference in its entirety.

BACKGROUND

1. Technical Field

Embodiments of the inventive concept relate to a forensic system, method, and program, and in particular, to a forensic system, method, and program for outputting litigant-related digital document information.

2. Background Art

Conventionally, a technique called "forensics" is used to collect and analyze devices, data, and electronic records when a crime or a legal conflict related to computers occurs, such as an illegal access, information leakage, or the like. Techniques for investigation into the cause of or to otherwise clarify legal evidences thereof have been proposed.

Particularly, in civil litigation in United State of America, since such a procedure as eDiscovery is required, both a plaintiff and a defendant involved in the litigation must submit all related digital information as evidences. They also need to submit digital information recorded in computers and/or servers as evidentiary material as well.

Due to the rapid development and spreading of information technologies, most information that is being produced in today's world is being produced or otherwise replicated by computers, such that massive amounts of digital information are generated, even within the same company. In particular, in a multinational company, significant amounts of digital information is described in a multitude of different languages.

For this reason, translation costs for digital document information stored in different languages, especially those that are not described in a standard language, when involved with a lawsuit, are enormous. The process of preparing information and providing evidentiary documents to a court of law is therefore complicated and costly. Even though different document files may have the same contents described therein, the document files are often independently translated by different parties to the lawsuit, thereby causing duplicated translations in vain.

In recent years, techniques related to a forensic system are proposed in Japanese Patent Application Laid-Open No. 2006-178521 and Japanese Patent Application Laid-Open No. 2007-148731.

Japanese Patent Application Laid-Open No. 2006-178521 discloses a forensic system that can efficiently identify a person who performs an illegal act by a method that can prove the conservation of competence of evidence, which makes it hard to affect the reliability of the identification by a human element.

Japanese Patent Application Laid-Open No. 2007-148731 discloses a forensic system that is an information damage insurance that pays the insurance on damage caused by leaking of private information and includes forensics having an after-the-fact response, i.e., identification of a criminal person and a legal action as the contents of compensation for damage.

However, for example, in the prior art literature, when litigant-related document files included in digital document information are to be collected, most often, all the document files are collected. As a result, vast amounts of information are collected, and document files in which the same contents are described, are redundantly and needlessly collected.

For this reason, a large amount of labor and tremendous amount of money are disadvantageously required to perform analysis and confirmation to search for only document files required for translation.

Thus, in consideration of the circumstances, it would be desirable to provide a forensic system, method, and program that do not analyze all document files, but rather, that analyze or output only the document files that are needed to be translated.

SUMMARY

A forensic system according to the inventive concept may acquire digital information recorded in a plurality of computers or a server to analyze the acquired digital information. The forensic system may include: a digital information acquiring unit configured to acquire digital information including digital document information having a plurality of document files and user information related to a user who uses the plurality of computers or the server; a recording unit configured to record the digital information acquired by the digital information acquiring unit; a display unit configured to display the recorded digital information and the user information; a designation accepting unit configured to accept designation of at least one document file included in the digital document information, and to accept designation of a specific language into which the at least one document file, the designation of which is accepted, is translated; a translation processing unit configured to translate the at least one document file, the designation of which is accepted, into the language the designation of which is accepted; a common document file extracting unit configured to extract a common document file representing the same content as that of the designated document file from the digital document information recorded in the recording unit; a translation-related information generating unit configured to generate translation-related information representing that the extracted common document file is translated by invoking a translated content of the translated document file; and an output unit configured to output a litigant document file based on the translation-related information. An output of the document file can be any one of a paper output obtained by a printer, an output obtained by storing an electronic medium obtained by a digital document file creating device in a recording medium, and/or an output displayed on a display unit.

The "digital information acquiring unit" may acquire digital information recorded in a plurality of computers or a server. As an acquiring method, for example, the digital information acquiring unit copies the digital information recorded in the computers or the server in a certain electronic medium to cause the forensic system to copy the digital information through the electronic medium. The computers or the server may be connected to the forensic system through a network channel to copy digital information recorded in the computers or the server in the forensic system, and/or other methods are used so as to preserve the digital information.

The "translation-related information generating unit" may generate information representing a translated document file in a plurality of document files. For example, the translation-related information may be recorded in incidental information of a document file, the designation of which is accepted.

The "translation-related information" may include data that causes the forensic system to determine whether a document file is a translated document file. More specifically, the translation-related information can show a specific document file and a specific language into which the specific document file is translated, such that the computer can discriminate or otherwise determine the specific document file and the specific language.

The "translation-related information generating unit" may record, for example, the translation-related information in incidental information of a common document file.

The "translation-related information generating unit" may record, for example, the translation-related information in the recording unit.

The "server" may include one or more servers, and may include, for example, a plurality of servers. For example, the "server" may be characterized by including any two or more of a mail server, a file server, and a document management server.

The "display unit" is a display, or the like, that can display digital information.

The "output unit" can output or produce digital document information or some other electronic data, and may be any one of a printer, a digital document file creating device, and/or a display unit.

In the forensic system according to the inventive concept, the translation-related information may further include information representing that a common document file has the same translated content as that in a translated document file, and information representing an output priority order of document files in the output unit. The output unit may control permission of outputting each document file based on the information representing the priority order.

The "information representing having the same translated content" may include data to cause the forensic system to determine that the document files have the same contents. More specifically, by hash names, other numerical value numbers, signs, characters, and the like, that are recorded in the control unit, the information represents that the document files have the same translated content.

The "information representing priority order" may include information representing the output unit of the forensic system has a priority order in which a predetermined document file should be output. For example, the priority order may be represented by a numerical value number, a sign, a character, or the like.

The forensic system according to the inventive concept may further include a data format discriminating unit that discriminates or otherwise determines a data format of a document file of digital document information recorded by the recording unit. The output unit may perform a control such that, of the document files discriminated by the data format discriminating unit, when a translated document file has a data format different from that of a common document file, the common document file having the different data format is output. For example, the data format discriminating unit may discriminate or otherwise determine a data format of a document file of the recorded document information. More specifically, the data format discriminating unit may discriminate or otherwise determine data formats of a Word® document, an Excel® document, a PowerPoint® document, a PDF document, or the like. For example, when a translated document file is a Word® document, when a common document file having the same contents as those of the Word® document is a PowerPoint® document or the like, control is performed to also output the PowerPoint® document because the Word® document and the PowerPoint® document have different data formats.

The forensic system according to the inventive concept further includes an incidental information setting unit that, through the display unit, can set incidental information representing whether document files of extracted digital document information are connected to litigation. The output unit may output a litigant document file based on the translation-related information and the incidental information.

The forensic system according to the inventive concept may further include a language determining unit that determines a specific language in which each of a plurality of document files is described based on the recorded digital document information. The recording unit may record the plurality of document files such that the document files are classified into language-sorted folders, respectively, depending on the results of languages determined by the language determining unit.

A forensic method according to the inventive concept that acquires digital information recorded in a plurality of computers or a server to analyze the acquired digital information. The method may include: acquiring digital information including digital document information configured by a plurality of document files and user information related to a user who uses the plurality of computers or a server; recording the digital information acquired by a digital information acquiring unit; displaying the recorded digital information and the user information; accepting designation of at least one document file included in the digital document information and accepting designation of a specific language into which the at least one document file, the designation of which is accepted, is translated; translating the at least one document file, the designation of which is accepted, into the language the designation of which is accepted; extracting a common document file representing the same contents as that of the designated document file from the digital document information recorded in the recording unit; generating translation-related information representing that the extracted common document file is translated by invoking a translated content of the translated document file; and outputting a litigant document file based on the translation-related information. An output of the document file is any one of a paper output obtained by a printer, an output obtained by storing an electronic medium obtained by a digital document file creating device in a recording medium, and/or an output displayed on a display unit.

A non-transitory forensic program according to the inventive concept that acquires digital information recorded in a plurality of computers or a server to analyze the acquired digital information causes a computer to execute: a function of acquiring digital document information configured by a plurality of document files and user information related to a user who uses the plurality of computers or a server; a function of recording the digital information acquired by a digital information acquiring unit; a function of displaying the recorded digital information and the user information; a function of accepting designation of at least one document file included in the digital document information and accepting designation of a specific language into which the at least one document file, the designation of which is accepted, is translated; a function of translating the at least one document file the designation of which is accepted into the language the designation of which is accepted; a function of extracting a common document file representing the same contents as that of the designated document file from the digital document information recorded in the recording unit; a function of generating translation-related information representing that the extracted common document file is translated by invoking a translated content of the translated document file; and a function of outputting a litigant document file based on the translation-related information. An output of the document file is any one of a paper output obtained by a printer, an output obtained by storing an electronic medium obtained by a digital document file creating device in a recording medium, and/or an output displayed on a display unit.

The summary of the inventive concept described above does not necessarily cite all necessary characteristics of the inventive concept. For example, sub-combinations of the characteristic groups can be made.

DETAILED DESCRIPTION

Embodiments of the inventive concept will be described below with reference to the accompanying drawings.

Figure 1:
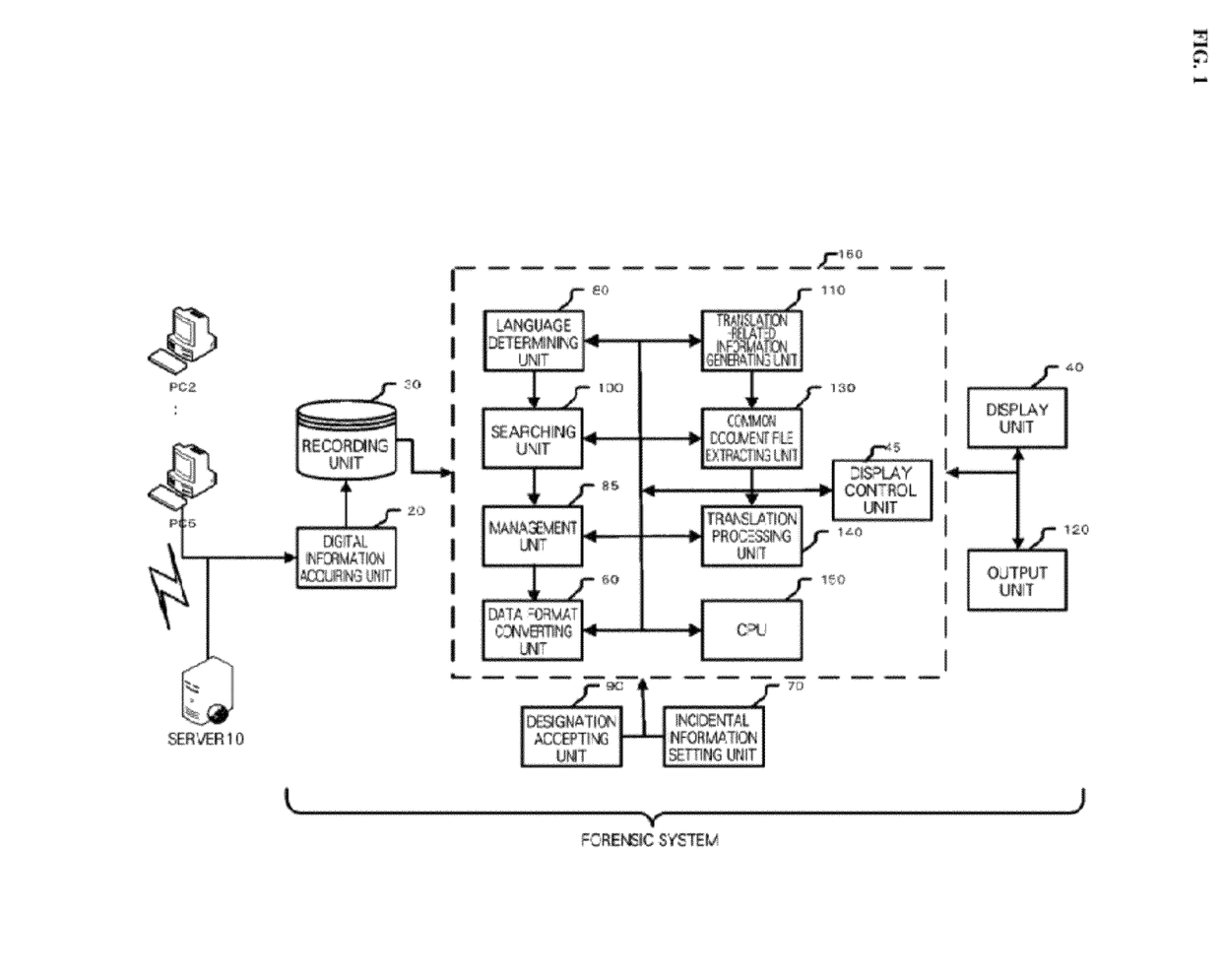
FIG. 1 is a block diagram showing a configuration of a forensic system according to a first embodiment of the inventive concept.

FIG. 1 is a functional block diagram showing a configuration of a forensic system 1 according to an embodiment of the inventive concept. The forensic system 1 shown in FIG. 1 may be connected to a plurality of computers (e.g., PC2 to 5) or a server 10 to analyze the acquired digital information. The forensic system 1 may include a digital information acquiring unit 20, which may acquire digital information including digital document information having a plurality of document files and user information related to a user who uses the plurality of computers or the server. The forensic system may also include a recording unit 30, which may record the digital information acquired by the digital information acquiring unit 20. In addition, the forensic system 1 may include a display unit 40, which may display the recorded digital information and the user information. Moreover, the forensic system 1 may include a designation accepting unit 90, which may accept designation of at least one document file included in the digital document information, and which may accept designation of a specific language into which the document file, the designation of which is accepted, is translated. The forensic system 1 may include a translation processing unit 140, which may translate the document file, the designation of which is accepted, into the specific language. The forensic system 1 may include a common document file extracting unit 130, which may extract a common document file representing the same content as that of the designated document file from the digital document information recorded in the recording unit 30. The forensic system may also include a translation-related information generating unit 110, which may generate translation-related information representing that the extracted common document file is translated by invoking a translated content of the translated document file. Further, the forensic system may include an output unit 120, which may output a litigant-related document file based on the translation-related information.

A control unit 160 includes a display control unit 45, a data format converting unit 60, a language determining unit 80, a management unit 85, a searching unit 100, a translation-related information generating unit 110, a common document file extracting unit 130, a translation processing unit 140, and/or a CPU 150.

The forensic system 1 may include a data input device such as a touch panel. For example, a keyboard, a mouse, or the display unit 40 may include a touch panel function. An incidental information setting unit 70 and/or the designation accepting unit 90 may also be provided as data input devices. The designation accepting unit 90 and the incidental information setting unit 70 may be different input devices or the same data input devices. The output unit 120 may be a recording device or a printer that records data on an electronic medium or other suitable physical medium.

The configuration of the forensic system 1 as shown in FIG. 1 is realized by calculating and executing a forensic program loaded on an auxiliary memory device (not shown) by the CPU 150 on a computer. The forensic program may be stored in a recording medium such as a CD-ROM or distributed through a network such as the Internet and/or installed in the computer.

In the first embodiment of the inventive concept, the forensic system 1 is explained as a personal computer. However, the forensic system 1 may be a mobile-terminal-type computer or the like, or a network-type system configuration, as will be described below in connection with a second embodiment.

The digital information acquiring unit 20 may acquire digital information recorded in the computer (e.g., PC2 to 5) or the server 10 that is used by a user. For example, the digital information acquiring unit 20 may copy the digital information recorded in the PC2 to 5 or the server 10 to a certain electronic medium (e.g., a USB, a CD, a DVD, or the like) and cause the forensic system to copy the digital information to the electronic medium.

When the PC2 to 5 or the server 10 are connected to the forensic system 1 through a network channel, the digital information acquiring unit 20 may accept data transmission of the digital information recorded in the PC2 to 5 or the server 10 through the network to preserve the digital information. The translation-related information is data that makes the forensic system possible to determine whether a document file is a translated document file. More specifically, the translation-related information shows a specific document file and a specific language into which the specific document file is translated, such that the computer can determine the specific document file and the specific language.

The translation-related information generating unit 110 may generate information representing a translated document file in a plurality of document files. For example, the translation-related information may be recorded in incidental information of the document file the designation of which is accepted by the designation accepting unit 90. The translation-related information generating unit 110 may record the translation-related information in incidental information of the common document file. The translation-related information generating unit 110 may record the translation-related information in the recording unit 30.

The digital information acquiring unit 20 may acquire second digital information including second digital document information and second user information, which may be recorded in a second server different from the server 10. In this case, the forensic system 1 may use not only the digital information in the server 10 but also the second digital document information recorded in the second server.

In the forensic system 1 the translation-related information further includes, for example, information representing that the common document file has the same translated content as that of the translated document file, and information representing an output priority order of document files in the output unit 120. The output unit 120 may control permission of an output of each document file based on the information representing the priority order.

The information representing that the document files have the same translated content includes data that facilitates the forensic system 1 to make a determination that the document files have the same content. More specifically, it may be shown by a hash name, another numerical value number, a character, or the like, which may be recorded in the control unit, that the document files have the same content.

The information representing the priority order includes information representing that the recording unit 30 of the forensic system 1 has a priority order in which a predetermined document file should be output. For example, the priority order may be represented by a numerical value number, a sign, a character, or the like.

The forensic system 1 further includes the data format converting unit 60, which may determine a data format of a document file of digital document information recorded by the recording unit 30. The output unit 120 may perform control such that, of the document files discriminated by the data format discriminating unit 60, when a translated document file has a data format different from that of a common document file, the common document file having the different data format is output.

The display unit 40 may display the content by using the display control unit 45 configured using the control unit 160. When the digital information acquiring unit 20 acquires digital information in the nth place (e.g., n=2, 3, . . . ), the digital information acquiring unit 20 may acquire only digital document information and folder information formed in the PC2 to 5 or the server 10, based on the information representing time of day measured by the control unit 160, after the digital information is acquired in the (n–1)th place.

The server 10 can include one or more servers, for example, and may be configured as a plurality of servers. In addition, the server 10 may include any two or more of at least a mail server, a file server, and a document management server. The forensic system 1 may be used by one or more operators, and/or may be simultaneously used by a plurality of operators.

Figure 4:
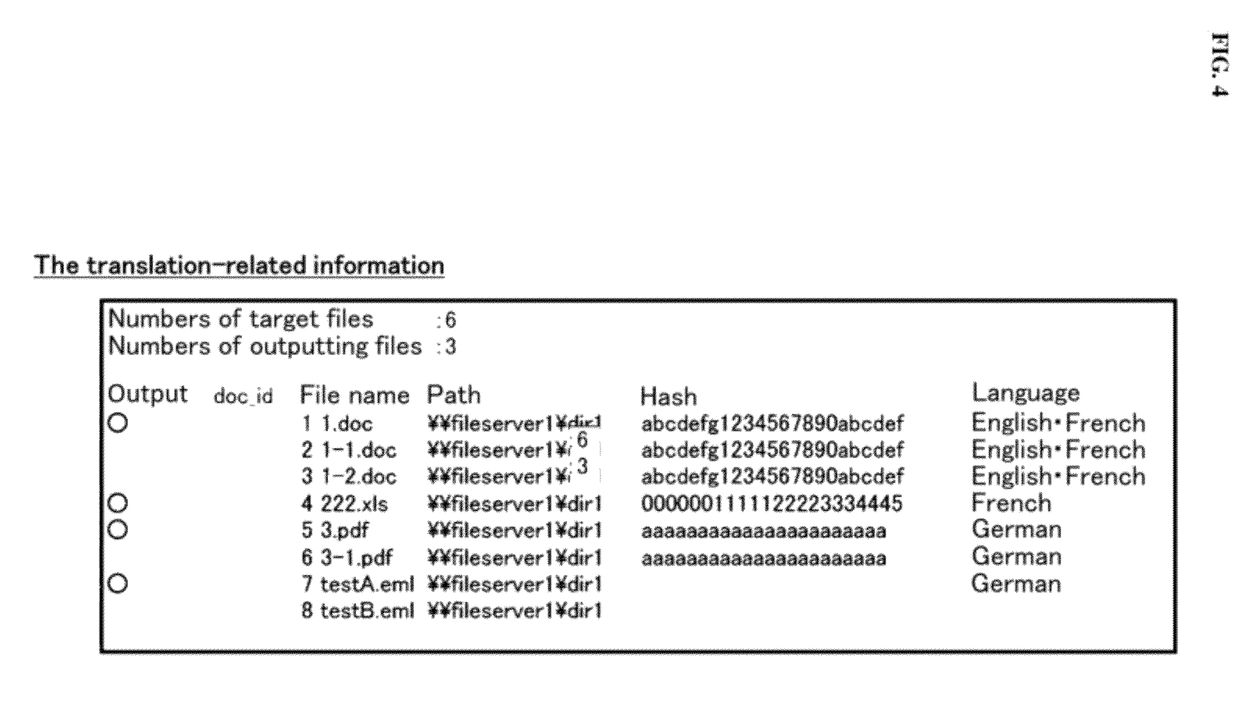
FIG. 4 is a diagram showing translation-related information of the forensic system according to the inventive concept.

The incidental information may be set using the plurality of incidental information setting units 70 while a plurality of operators simultaneously confirm digital document information. More specifically, the operator(s) may select a specific language in which each document file records a language, and/or in which each document file is described as incidental information (e.g., language tag information). The language determining unit 80 may determine a language in which each document file is described, and may record information representing the languages in which the document files are described as incidental information (e.g., language tag information) in units of document files, and/or may record the information as the translation-related information as shown in FIG. 4.

The language determining unit 80 may generate, for example, a plurality of partial character strings from character strings of a predetermined language according to a predetermined rule. The language determining unit 80 may further search for a character string of a document file stored in the recording unit 30. The language determining unit 80 may discover a character string matched with the generated partial character string. The language determining unit 80 may evaluate a language to which each partial character string may belong and the possibility of each of the partial character strings belonging to the language, thereby determining a language to which a character string of a predetermined document file belongs.

The output unit 120 may produce and/or output digital document information. The output unit 120 may include, for example, a printer or a recording device that records digital information on an electronic medium or other suitable physical medium. The output unit 120 may be the display unit 40, which may display and output the digital document information.

The translation processing unit 140 may include a database in which translation resources classified into a plurality of classification items in units of fields are registered. Direction words, translated words, word classes, meanings, and the like, may be registered as the translation resources. In the translation processing unit 140, classification items may have a hierarchical form such that, for example, a route, a higher level, an intermediate level, and a lower level correspond to a large item, an intermediate item, and a small item, respectively. The translation processing unit 140 may select a translation resource related to a classification item associated with digital document information, and, on the base of the selected translation resource, translate an original document, operation information, and the like, in the input data into at least another language.

A procedure of performing a preparatory operation to provide sources of evidence or other evidentiary material to a court of law using the forensic system 1 is described below. "Forensics" are involved, for example, when a crime or a legal conflict related to computer such as an illegal access or intelligent information leakage occur. The devices, data, electronic records that are needed for the investigation, or the like, can be collected and analyzed, and the legal pertinence or competence of the evidence thereof can be determined.

In particular, in civil suits in the United States, eDiscovery (electronic discovery) or the like is usually required. Since both a plaintiff and a defendant of the lawsuit have a responsibility for providing all pieces of related digital information as evidence, they must also provide digital information recorded in computers or a server as evidence.

Figure 2:
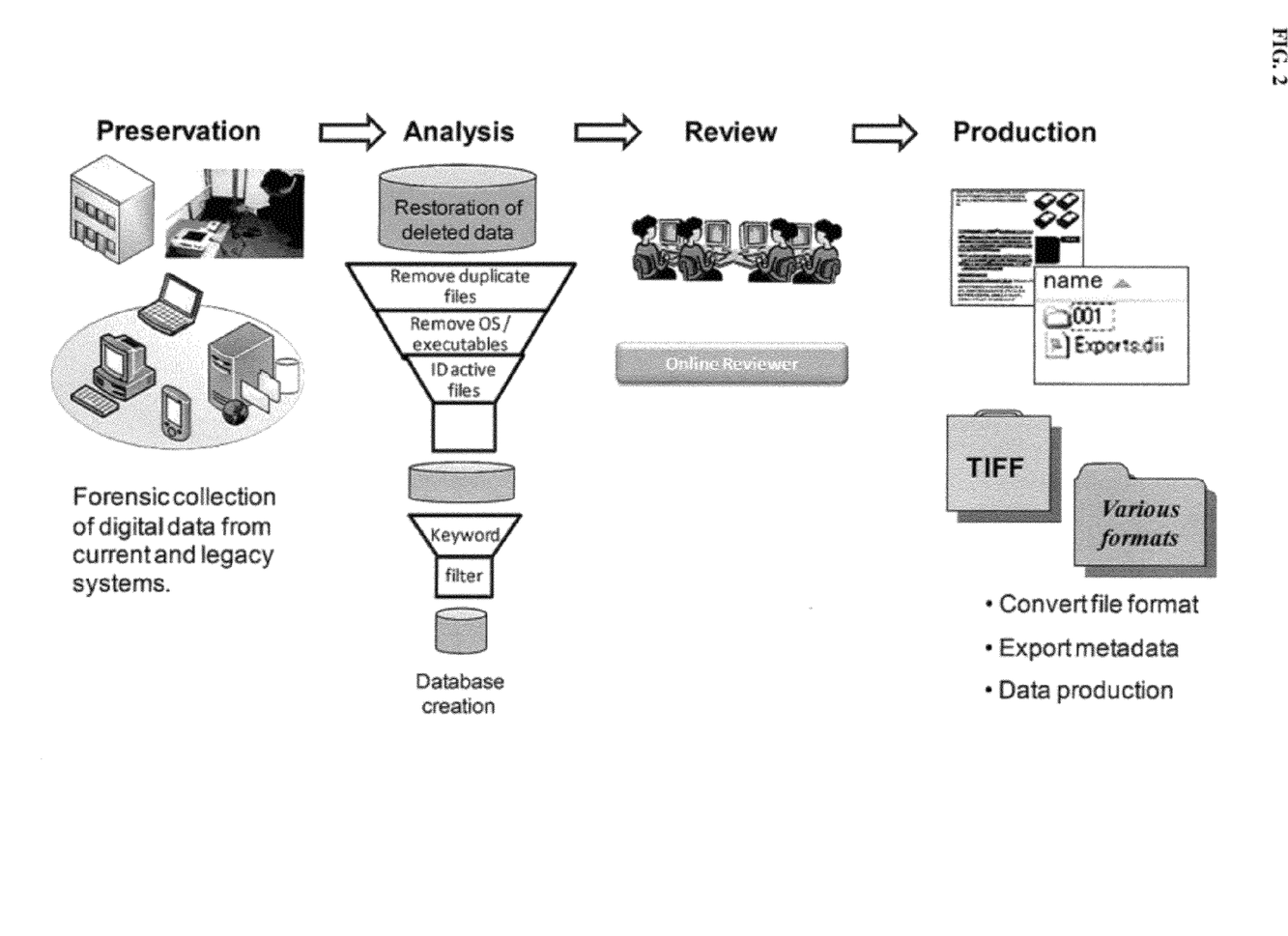
FIG. 2 is a diagram showing a flow of a forensic system service according to the inventive concept.

FIG. 2 is a diagram showing a flow of a forensic system service according to the inventive concept. Reference is now made to FIGS. 1 and 2.

The forensic system 1 can sort litigant-related digital information and preserve (e.g., Preservation of FIG. 2) the digital information recorded in the PC2 to 5 or the server 10 to perform a preparatory operation for providing sources of evidence or other evidentiary material to a court of law.

Thereafter, the forensic system 1 may register the preserved digital information in a database such as the recording unit 30, analyze (e.g., Analysis of FIG. 2) the digital information, and segment the digital information by keyword searching or filtering. The recording unit 30 may be included in the computer of the forensic system 1 or may be stored in a server as a member being independent from the computer.

The forensic system 1 may review (e.g., Review of FIG. 2) the segmented digital information on the display unit 40, and the operator(s) may set incidental information to the digital document information using the incidental information setting unit 70.

The control unit 160 may include a preserving, analyzing, and/or searching function. In addition, the control unit 160 may include a process analyzing and/or searching function. Further, the control unit 160 may include a review function and/or a production function.

For example, the preserving, analyzing, and/or searching function of the control unit 160 may include a case management function (i.e., functions of the management unit 85). In addition, the preserving, analyzing, and/or searching function of the control unit 160 may include a file analyzing function (i.e., a function of the searching unit 100), which can analyze types of files and the number of held files in units of object persons and/or evidential matters to make it possible to analyze a file to be searched for. Moreover, the preserving, analyzing, and/or searching function of the control unit 160 may include a file type selecting and/or extracting function (i.e., function of the control unit 160), which makes it possible to select a file type to be searched for and/or browsed. Further, the preserving, analyzing, and/or searching function of the control unit 160 may include a preserving function (i.e., a function of the control unit 160), which makes it possible to preserve a selected file as another file. The process analyzing and/or searching function of the control unit 160 may include a full-text searching function and a frequently appearing top extracting function (i.e., a function of the searching unit 100).

The full-text searching function copes with a large number of languages, which makes it possible to perform AND, OR, and NOT searching by a Boolean operation, thereby making it possible to perform searching using brackets by a grouping operation. Further, the full-text searching function may include a highlight function for a searched word and a function of making meta data. The full-text searching function may include a high-level searching function to make it possible to perform proximity searching, regular expression searching, and the like. The frequently appearing top extracting function may extract a frequently appearing word in certain digital document information.

The review function of the control unit 160 may includes an e-mail family browsing process function (i.e., a function of the searching unit 100), which can browse, for example, an e-mail family at once. Further, the review function of the control unit 160 may include a free design tag function (i.e., a function of the searching unit 100), which can search for information in which one evaluation or a plurality of evaluations are set as incidental information based on the evaluations. In addition, the review function of the control unit 160 may include a free design book-mark function (i.e., a function of the searching unit 100), which makes it possible to perform book-mark searching of information in which a hierarchical structure book-mark is set. Further, the review function of the control unit 160 may include a free input comment column (i.e., a function of the management unit 85) where a comment column in which an arbitrary number of characters can be input is set.

Also, the review function of the control unit 160 may include a simultaneous browsing function used to cause the plurality of operators to simultaneously confirm digital document information. In addition, the review function of the control unit 160 may include an access right control function (i.e., a function of the management unit 85), which makes it possible to set an access right, an administrative right, a browsing-only right, and the like, for each account of a browsing person (e.g., operator) when the review is performed. In addition, the review function of the control unit 160 may include an in-document writing memo function (i.e., a function of the management unit 85), which makes it possible to perform writing in a document without changing the text of the digital document information. Further, the review function of the control unit 160 may include a case management function (i.e., a function of the management unit 85), which makes it possible to display the number of review-completed documents (e.g., in terms of a percentage).

In addition, the review function of the control unit 160 may include an e-mail threading function (i.e., a function of the management unit 85), which displays e-mail threads (e.g., returning, transferring, and the like) at once. Further, the review function of the control unit 160 may include a mail analyzing display function (i.e., function of the common document file extracting unit 130), which may graphically display a mail exchange. Also, the review function of the control unit 160 may include a similar document display function (i.e., function of the management unit 85), which may automatically classify and display similar documents such as a draft and an old version. In addition, the review function of the control unit 160 may include a similar document difference highlight function (i.e., function of the management unit 85), which may highlight-display only a different portion of similar documents. Further, the review function of the control unit 160 may include a search-hit portion before and/or after sentence display function (i.e., function of the searching unit 100), which may display only a peripheral portion of a search-hit word.

The production function of the control unit 160 may include a various-output function (i.e., function that can output data from the output unit 120 by a designation from the management unit 85) of an XML output such as a real file, meta-information, or tag information, a comma separated value (CSV) output, an image output, and/or various load file outputs. In addition, the production function of the control unit 160 may include a batch printing function (i.e., a function that can output data from the output unit 120 by a designation from the management unit 85).

Further, the forensic system 1 may perform production (e.g., Production in FIG. 2) to cause the output unit 120 to generate data for an electronic medium. For example, using a recording device that records data in an electronic medium, the data can be recorded in the recording medium in a predetermined data format. Procedures of performing a preparatory operation to provide sources of evidence or other evidentiary material to a court of law using the forensic system 1 will be described in detail below.

Figure 3:
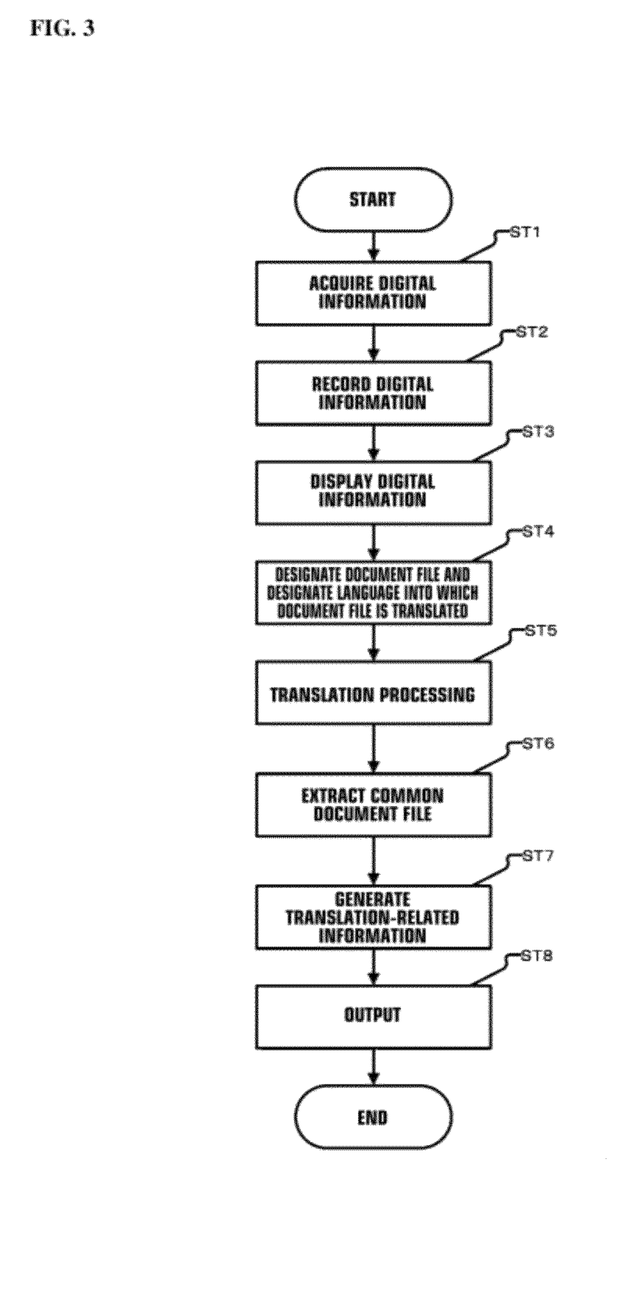
FIG. 3 is a flow chart showing a process flow of the forensic system according to the inventive concept.

FIG. 3 is a flow chart showing a process flow of the forensic system according to the inventive concept.

The digital information acquiring unit 20 may acquire digital information including digital document information configured by a document file formed by a general-purpose format such as a Word® format, a PDF format, a PPT format, or an Excel® format, and/or user information related to a user who uses the PC2 to 5 or the server 10 (ST1).

Access history information may be included in the digital information. The access history information shows that the user who uses the PC2 to 5 accesses the digital document information recorded in the server 10 through a network. For example, the access history information may include a user ID representing who is the user, a period of time in which the user accesses specific digital information, and the digital document information.

The PC2 to 5 are described, for example, as 4 PCs. However, it will be understood that the number of PCs is not limited to 4. For example, two or more PCs may be used.

The digital information acquiring unit 20 may record the acquired digital information in the recording unit 30 (ST2). The display unit 40 may display the digital information (e.g., digital document information, user information, access history information, and/or a title of digital information, and the like) (ST3).

For example, the display unit 40 may display all the user information, the digital document information, and the access history information in response to a designation from the display control unit 45. In addition, the display unit 40 may display at least one of the pieces of information, and may display at least one of the pieces of attribute information (e.g., a name of user, a file name of document file, a person who accesses the information, a period of time, and/or a document file, and the like).

Other functions obtained through the display unit 40 of the forensic system 1 will be described below. For example, the operator(s) may log into the forensic system 1 while using a confirming screen of the display unit 40, and, furthermore, may create a case (e.g., a unit of an uppermost data group of the database in the forensic system 1). The operator(s) may set and manage destinations of servers or the like corresponding to recording units 30 (e.g., two or more recording units 30 may be present) in which digital information is recorded while using the confirming screen of the display unit 40. The operator(s) may set and manage a custodian (e.g., a data holding object representing a person) while using the confirming screen of the display unit 40. The operator(s) may perform creation and state management of a target (e.g., a middle-level group unit of the database of the forensic system 1) configured by collected and preserved digital document information, while using the confirming screen of the display unit 40. The operator(s) may associate the collected and preserved target with the custodian.

For example, the operator(s) may set a specific custodian related to a lawsuit in advance for a plurality of targets configured by digital document information acquired from the PC2 to 5 or the server, while using the confirming screen of the display unit 40. In addition, the operator(s) may cause one or more targets to be analyzed while using the confirming screen of the display unit 40.

In this manner, the control unit 160 may acquire the digital information recorded in the recording unit 30 and can analyze the digital information by using various functional units.

The forensic system 1 includes the control unit 160, which creates statistical data expressed by a data capacity of each data format of the digital document information recorded in the recording unit 30 or statistical data expressed by a data capacity of each data format of the data searched by the searching unit 100.

For example, the operator(s) may select a custodian to be analyzed and a predetermined path (e.g., directory) from a target associated with the custodian while using the confirming screen of the display unit 40 to make it possible to display analysis results of the numbers of files and capacity of the custodians. The operator(s) can display a list of analysis results of the numbers of files and capacities of the paths while using the confirming screen of the display unit 40. The operator(s) can display a list of analysis results of the numbers of files and capacities of file types as a chart while using the confirming screen of the display unit 40. The operator(s) can display a list of analysis result of the number of files and capacities of file types while using the confirming screen of the display unit 40.

The operator(s) can display a list of analysis results of the numbers of files and capacities of file types as a chart while using the confirming screen of the display unit 40. Furthermore, the operator(s) can display a list of analysis results of the numbers of files and capacities of file types of only files that can be text-searched while using the confirming screen of the display unit 40. The files that can be text-searched are searched in advance by the control unit 160, which can be extracted from the digital document information recorded in the recording unit 30.

Returning to the explanation of the flow chart shown in FIG. 3, the designation accepting unit 90 may accept a designation of at least one document file included in the digital document information and accept a designation of a specific language into which the designated document file is translated (ST4). The operator(s) may select a document file desired to be translated and specific terms into which the document file is desired to be translated while using the confirming screen of the display unit 40.

The translation processing unit 140 may automatically translate the document file, the designation of which is accepted by the designation accepting unit 90, into the language the designation of which is accepted by the designation accepting unit 90 (ST5). A translator may translate the document file, the designation of which is accepted by the designation accepting unit 90, into the language the designation of which is accepted by the designation accepting unit 90.

The common document file extracting unit 130 may extract a common document file representing the same content as that of the document file designated by the designation accepting unit 90 from the digital document information recorded in the recording unit 30 (ST6).

The common document file extracting unit 130 can extract a common document file by using a hash table of the document files recorded in the recording unit 30. More specifically, the common document file extracting unit 130 may record an ID name, a file name, a path name, and/or a hash name of a document file and a language name representing a language content of the document file in association with each other. When document files have the same hash name, the common document file extracting unit 130 can extract the document files having the same hash name, except for a document file the designation of which is accepted as a common document file.

The common document file extracting unit 130 may include an algorithm that discriminates or otherwise determines the identity of the contents of the text data of the document files. According to the algorithm, the common document file that is the same document file as the document file the designation of which is accepted may be extracted.

The translation-related information generating unit 110 may generate translation-related information representing the extracted common document file is translated by invoking the translated content of the translated document file by using the common document file extracting unit 130 (ST7). The translation-related information generating unit 110 may generate translation-related information such that the operator(s) set the translation-related information through the designation accepting unit 90.

The output unit 120 may output a litigant-related document file based on the translation-related information (ST7). The translation-related information may include information representing that a common document file has the same translated content as that of the document file designated by the designation accepting unit 90. In addition, the translation-related information may include information representing an output priority order of the document file in the output unit 120. The output unit 120 may control permission of the output of a document file based on the information representing the priority order.

More specifically, information representing that document files having the same hash name, as shown in FIG. 4, may also have the same translated content, and therefore, an output priority order can be relied upon such that a document file having a smaller ID number is preferentially output.

The forensic system 1 may include the data format converting unit 60, which may discriminate or otherwise determine a data format of a document file of digital document information recorded by the output unit 120. Of the document files discriminated by the data format converting unit 60, when a designated document file has a data format different from that of the common document file, the output unit 120 may control the output such that a common document file having a different data format is output. More specifically, when the document files have the same hash name and different data formats, the output unit 120 may control the output such that the common document file is outputted. For example, the data format converting unit 60 may discriminate or otherwise determine a data format of the document file of the recorded document information; more specifically, a data format such as a Word® document, an Excel® document, a PowerPoint® document, and a PDF document may be output. For example, when the translated document file is a Word document, when a common document representing the same contents as those of the word document is a PowerPoint® document, the Word® document and the PowerPoint® document have different data formats. For this reason, control is performed to also output the PowerPoint® document.

Since the access right of a person can be set when the status of the person is high in an organization, in many cases, when a digital document information the access right of which is set to a custodian is reviewed (e.g., confirmed), in fact, the control unit 160 can consequently collect volumes of documentation that is not actually browsed by the person and that is not related to litigation. This results in a large amount of labor and money to perform the analysis to find out only the documents related to the person.

Thus, the control unit 160 may extract only digital document information which a specific person accesses based on access history information related to a designated specific person (e.g., custodian).

For example, when an operator designates a first party who is a custodian, only a document file which the first party accesses is extracted. By using the access history information, a document file which the first party actually accesses (e.g., browses, edits, or creates) can be extracted. The access history information shows that a user who uses one of a plurality of computers accesses digital document information recorded in a server. For example, the access history information includes a user ID representing who is the user, and access information representing digital document information, which the user accesses, and a period of time in which the person accesses the digital document information. ID information can be used when the first party uses a computer or a server and access history information, which may be recorded in the recording unit 30 to make it possible to extract a document file which the first party accesses by associating the ID of the first party with the document file.

Although the first party is provided as an example in the above description, when, in addition to the first party, a plurality of custodians such as second party are designated, the data format converting unit 60 can extract a document file related to the plurality of custodians.

As described above, when the operator sets a relationship between a target and a custodian, consistently, as the custodian in a unit of the target, the operator can determine that the target and the custodian are related to each other and extract only a document file which the custodian actually designated by the designation accepting unit 90 in the selected target accesses.

Furthermore, the operator(s) can perform searching by using the function of the searching unit 100, while using the confirming screen of the display unit 40. The operator(s) can perform simple browsing while using the conforming screen of the display unit 40. The operator(s) can recognize the contents of the digital document information by the simple browsing.

In use of the forensic system 1, a tag "hot" (e.g., incidental information) is given to the litigant information in units of files, a tag "responsive" (e.g., incidental information) is given to information that may be related to the litigation in units of files, and/or a tag "not responsive" (e.g., incidental information) is given to information that is never to be related to the litigation. More specifically, a file line of a batch list may be clicked to make it possible to input the tag.

The operator(s) may designate the CPU 150 to output a litigant document file from the output unit 120 based on the incidental information. The CPU 150 that accepts a designation from the operator(s) can control the output unit 120 to output the document file. For example, only a document file to which "hot" is given may be output, and a document file to which "hot" and "responsive" is given may be output, among other combinations and possibilities.

The forensic system 1 may include the incidental information setting unit 70, which may that set incidental information representing whether each of the document files of the extracted digital document information is related to a litigant. The output unit 120 may output a litigant document file based on the translation-related information and the incidental information.

More specifically, the output unit 120 may output only a document file (e.g., having the same hash name and the highest priority order) that is designated by the designation accepting unit 90, and to which "hot" is given. Alternatively, the output unit 120 may output a document file (e.g., the same hash name and the highest priority order) that is designated by the designation accepting unit 90, and to which "hot" and "responsive" are given.

Figure 5:
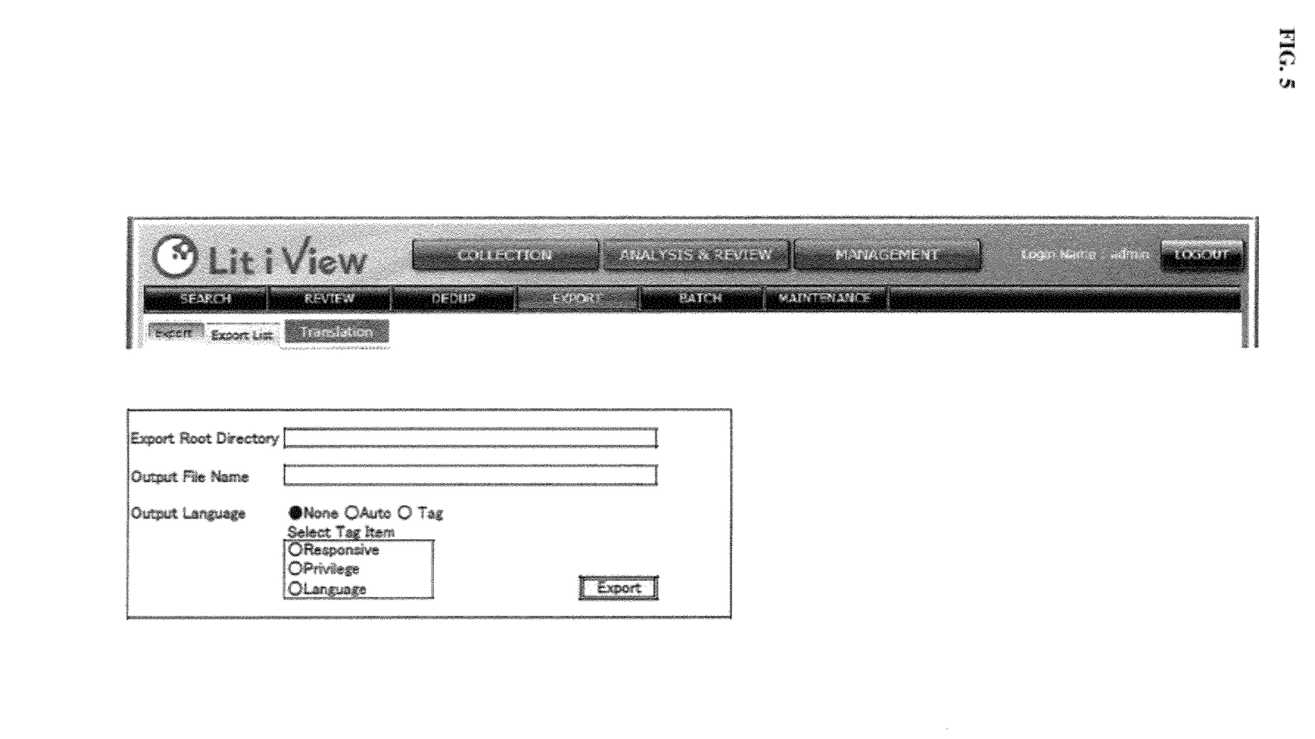
FIG. 5 is a screen (part 1) displayed on a display unit of the forensic system according to the inventive concept.

FIG. 5 is an example of a screen, which may be displayed on the display unit 40. More specifically, when the control unit 160 selects auto in output language, the control unit 160 may create directories of determination results of the language determining unit 80 in units of meta-information and outputs a target document file under the control of the directories. On the other hand, when the tag is selected in the output language, directories are created in units of tags, and a target document file under the control of the directories is output. When one document file includes a plurality of languages, the same document files can be arranged in language holders, respectively. A document to which no tag is attached is not a target for an output.

Figure 6:
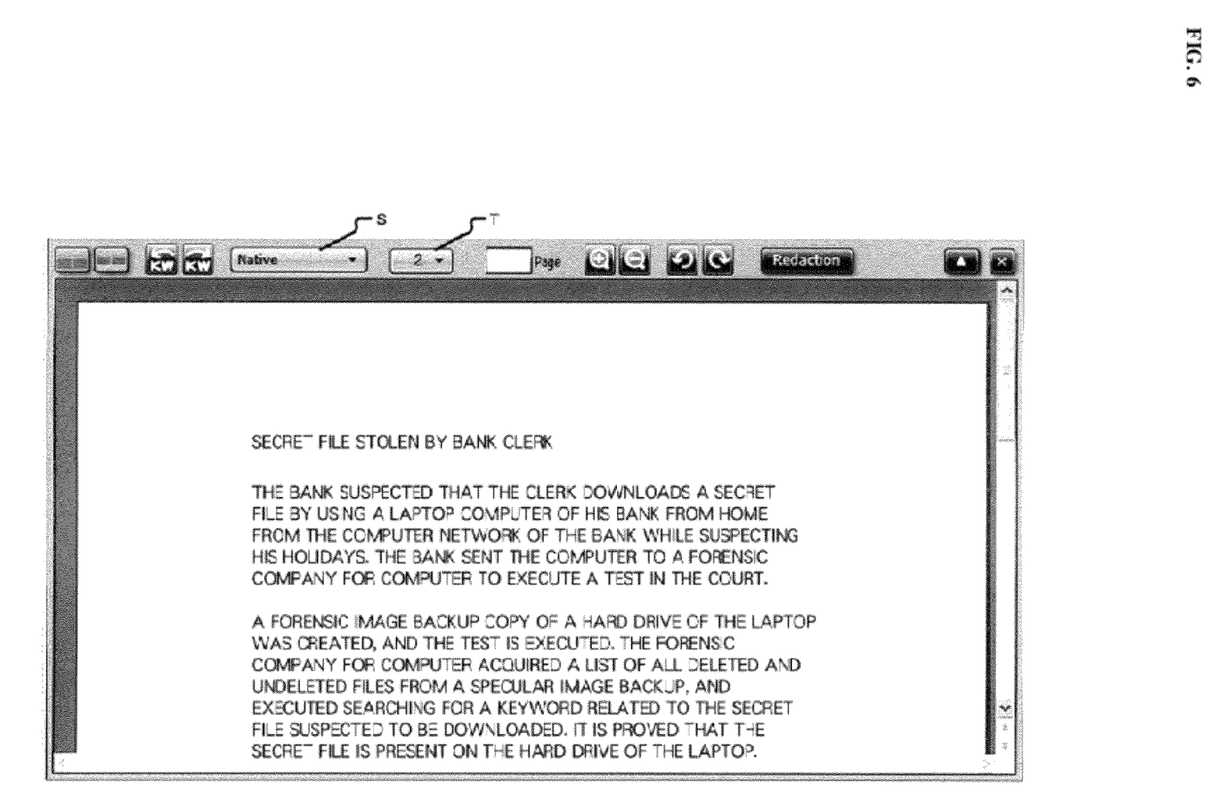
FIG. 6 is a screen (part 2) displayed on a display unit of the forensic system according to the inventive concept.

FIG. 6 is an example screen, which may be displayed on the display unit 40. When the document file includes a translated document file, a sign T may be clicked to make it possible to switchably display document files expressed in the languages. When there are a plurality of document files having the same data format, a sign S may be clicked to make it possible to switchably display a document file of a designated ID number.

The forensic system 1 may be configured by a plurality of forensic-system servers, a digital information extracting unit, and a searching unit may be separated from each other in the forensic-system servers. Furthermore, the separated forensic systems may be connected to each other through a network.

Figure 7:
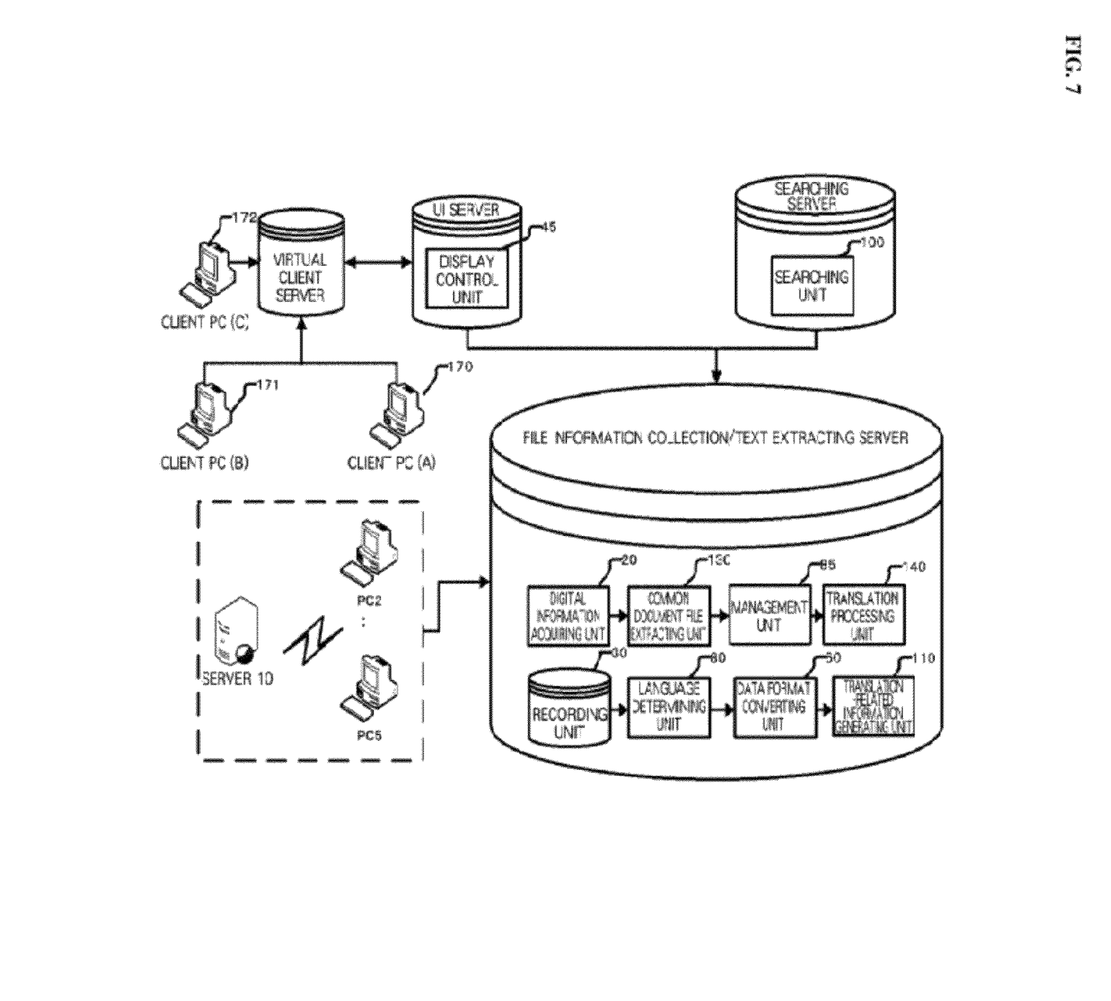
FIG. 7 is a functional block diagram showing a configuration of a forensic system according to a second embodiment of the inventive concept.

A second embodiment will be described below with reference to FIG. 7. The forensic system 1, as shown in FIG. 7, may have a network-type system configuration. The forensic system 1 according to the second embodiment has the same processing units as those of the forensic system 1 described in the embodiment above. However, the processing units are dispersed and arranged in a plurality of servers. The servers are connected to each other through a network. For this reason, servers may be domestically dispersed and arranged, or the servers may be internationally dispersed and arranged.

The display units 40 may be arranged in client PCs 170 to 172, respectively. Data exchanges may be integrated with each other in a virtual client server between the plurality of client PCs and a UI server to make it possible to improve the display response. In this manner, the forensic system 1 may be configured by a computer as described in the first embodiment, or the forensic system may be configured by a network-type system as described in the second embodiment.

According to the forensic system 1, the incidental information setting unit 70 and the designation accepting unit 90 may correspond to data input devices included in the client PCs 170 to 172, respectively.

According to the forensic system 1, designation of at least one document file included in digital document information is accepted, designation of a language into which the designated document file is translated, the document file the designation of which is accepted is translated into the language the designation of which is accepted, a common document file representing the same content as that of the designated document file is extracted from digital document information recorded in a recording unit, translation-related information representing that the extracted common document file is translated by invoking the translated content is generated, and based on the translation-related information, a litigant document file is output to make it possible to output minimum translated document files without outputting all translated document files. In this manner, redundant translation of pieces of digital document information having the same contents can be reduced.

The forensic system 1 may include the language determining unit 80 and the searching unit 100. When the incidental information setting unit 70 sets incidental information to searched document files, of digital document information recorded in a server, a parent population of only digital document information which a specific person accesses and that may be litigant can be narrowed down by predetermined searching.

According to the forensic system 1, when the document files converted by the control unit 160 are processed without changing the converted data format until the document files are output by the output unit 120, a useless data format converting step in the middle of the processing flow can be reduced, and the risk of deterioration in the quality of the digital document information can be excluded.

Furthermore, according to the forensic system 1, when the control unit 160 is arranged, statistical data can be visualized and provided to the operator(s). For this reason, the labor that is necessary for pretrial can be quickly and efficiently recognized.

Further, according to the forensic system 1, the digital information acquiring unit 20 may acquire only digital document information and holder information that are created after a certain time of day previously measured by the control unit 160. When only the acquired digital document information is acquired, and only the user information related to the folder information is acquired, and only the access history information is acquired, differential collection of the digital information is made possible, and a burden of redundantly acquiring the same digital information from a sever or the like each time can be reduced.

According to the forensic system 1, when the control unit 160 and the searching unit 100 are separately arranged in the forensic-system servers, respectively, calculating steps of the processing units are distributed by the servers to make it possible to improve the processing ability of the entire system.

According to the forensic system 1, when a plurality of operators can simultaneously use the system, since incidental information can be set by different operators, the incidental information setting unit 70 can perform an early preparatory operation by determining the information and/or sources of evidence or other evidentiary material, needed by a court of law, for a plurality of persons.

The above description is performed by using the embodiments of the inventive concept. However, the technical scope of the inventive concept is not limited to the scope described in the embodiments. It is apparent that the embodiments can be variedly changed or improved. It is apparent from the description of the scope of claims that the changed or improved embodiment can be included in the technical scope of the inventive concept.

For example, the entire systems or the processing units of the forensic systems 1 according to the first embodiment and the second embodiment can be combined with each other or used separately.

REFERENCE SIGNS LIST

1 . . . Forensic system
2 to 5 . . . PC
10 . . . Server
20 . . . Digital information acquiring unit
30 . . . Recording unit
40 . . . Display unit
45 . . . Display control unit
60 . . . Data format converting unit
70 . . . Incidental information setting unit
80 . . . Language determining unit
90 . . . Designation accepting unit
100 . . . Searching unit
110 . . . Translation-related information generating unit
120 . . . Output unit
130 . . . Common document file extracting unit
140 . . . Translation processing unit
150 . . . CPU
160 . . . Control unit
170 to 172 . . . Client PC

The invention claimed is:

1. A forensic system configured to acquire digital information recorded in a plurality of computers or a server, to analyze the acquired digital information, the system comprising:
   a digital information acquiring unit configured to acquire digital information including digital document information having a plurality of document files and user information related to a user who uses the plurality of computers or the server;
   a recording unit configured to record the digital information acquired by the digital information acquiring unit;
   a display unit configured to display the recorded digital information and the user information;
   a designation accepting unit configured to accept designation of at least one document file included in the digital document information, and to accept designation of a specific language into which the at least one document file, the designation of which is accepted, is translated;

a translation processing unit configured to translate the at least one document file, the designation of which is accepted, into the language the designation of which is accepted;

a common document file extracting unit configured to extract a common document file representing the same content as that of the designated document file from the digital document information recorded in the recording unit;

a translation-related information generating unit configured to generate translation-related information representing that the extracted common document file is translated by invoking a translated content of the translated document file, and information representing an output priority order of the plurality of document files;

a control unit including:
 a multi-language full-text searching unit configured to perform a multi-language full-text search of the document files; and
 a managing unit including an access right control function configured to set one or more rights for each account of a browsing person;

an incidental information setting unit configured to set incidental information representing whether document files of the extracted digital document information are related to a litigant;

a language determining unit configured to generate a plurality of partial character strings from character strings of a predetermined language according to a predetermined rule, to evaluate a language to which each partial character string from among the plurality of partial character strings may belong, to search for a character string of the at least one document file stored in the recording unit, to discover the character string that is searched as being a match with one of the plurality of generated partial character strings, and to determine a language to which the discovered character string of the at least one document file belongs; and an output unit configured to output a litigant document file based on the translation-related information, the incidental information, and the output priority order of the plurality of document files.

2. The forensic system according to claim 1, wherein the translation-related information generating unit is further configured to record the translation-related information in incidental information of the at least one document file, the designation of which is accepted.

3. The forensic system according to claim 1, wherein the translation-related information generating unit is further configured to record the translation-related information in incidental information of the common document file.

4. The forensic system according to claim 1, wherein the translation-related information generating unit is further configured to record the translation-related information in the recording unit.

5. The forensic system according to claim 1, wherein the translation-related information further includes information representing that the common document file has the same translated content as that of the designated document file, and further includes information representing an output priority order of the document file in the output unit, and the output unit is configured to control permission of outputting the document file based on the information representing the priority order.

6. The forensic system according to claim 5, further comprising:
a data format discriminating unit configured to discriminate a data format of a document file of the digital document information recorded by the recording unit, wherein
the output unit is configured to perform a control such that, of the document files discriminated by the data format discriminating unit, when a translated document file has a data format different from that of the common document file, the common document file having the different data format is output.

7. The forensic system according to claim 1, wherein the output unit is any one of a printer, a digital document file creating device, and the display unit.

8. The forensic system according to claim 1, wherein
the output unit is configured to output a litigant document file based on the translation-related information and the incidental information.

9. The forensic system according to claim 1, further comprising:
a language determining unit configured to determine a specific language in which each of the plurality of document files is described based on the recorded digital document information, wherein
the recording unit is configured to record the plurality of document files such that the plurality of document files are classified and recorded in language-sorted folders, respectively, depending on the results of languages determined by the language determining unit.

10. A forensic method for acquiring digital information recorded on a plurality of computers or a server to analyze the acquired digital information, the method comprising:
acquiring digital information including digital document information configured by a plurality of document files and user information related to a user who uses the plurality of computers or a server;
recording the digital information acquired by a digital information acquiring unit;
displaying the recorded digital information and the user information;
accepting designation of at least one document file included in the digital document information and accepting designation of a specific language into which the at least one document file, the designation of which is accepted, is translated;
translating the at least one document file, the designation of which is accepted, into the language the designation of which is accepted;
extracting a common document file representing the same contents as that of the designated document file from the digital document information recorded in a recording unit;
generating translation-related information representing that the extracted common document file is translated by invoking a translated content of the translated document file, and information representing an output priority order of the plurality of document files;
searching, by a multi-language full-text searching unit, the full-text of the document files;
setting, by an access right control function of a managing unit, one or more rights for each account of a browsing person;
setting incidental information representing whether document files of the extracted digital document information are related to a litigant;

generating a plurality of partial character strings from character strings of a predetermined language according to a predetermined rule;
evaluating a language to which each partial character string from among the plurality of partial character strings may belong;
searching for a character string of the at least one document file stored in the recording unit;
discovering the character string that is searched as being a match with one of the plurality of generated partial character strings;
determining a language to which the discovered character string of the at least one document file belongs; and
outputting a litigant document file based on the translation-related information, the incidental information, and the output priority order of the plurality of document files.

11. A non-transitory recording medium recording therein a forensic program which acquires digital information recorded on a plurality of computers or a server to analyze the acquired digital information to cause a computer to execute:
a function of acquiring digital document information configured by a plurality of document files and user information related to a user who uses the plurality of computers or a server;
a function of recording the digital information acquired by a digital information acquiring unit;
a function of displaying the recorded digital information and the user information;
a function of accepting designation of at least one document file included in the digital document information and accepting designation of a specific language into which the at least one document file, the designation of which is accepted, is translated;
a function of translating the at least one document file the designation of which is accepted into the language the designation of which is accepted;
a function of extracting a common document file representing the same contents as that of the designated document file from the digital document information recorded in a recording unit;
a function of generating translation-related information representing that the extracted common document file is translated by invoking a translated content of the translated document file, and information representing an output priority order of the plurality of document files;
a function of searching, by a multi-language full-text searching unit, the full-text of the document files;
a function of setting, by an access right control function of a managing unit, one or more rights for each account of a browsing person;
a function of setting incidental information representing whether document files of the extracted digital document information are related to a litigant;
a function of generating a plurality of partial character strings from character strings of a predetermined language according to a predetermined rule;
a function of evaluating a language to which each partial character string from among the plurality of partial character strings may belong;
a function of searching for a character string of the at least one document file stored in the recording unit;
a function of discovering the character string that is searched as being a match with one of the plurality of generated partial character strings;
a function of determining a language to which the discovered character string of the at least one document file belongs; and
a function of outputting a litigant document file based on the translation-related information.

12. The forensic system according to claim 1, wherein the access right control function of the managing unit is configured to set a browsing-only right.

13. The forensic system according to claim 1, wherein the access right control function of the managing unit is configured to set a manager right.

14. The forensic system according to claim 1, wherein the access right control function of the managing unit is configured to set an access right.

15. The method of claim 10, wherein setting further includes setting a browsing-only right.

16. The method of claim 10, wherein setting further includes setting a manager right.

17. The method of claim 10, wherein setting further includes setting an access right.

18. The non-transitory recording medium of claim 11, wherein the function of setting further includes a function of setting a browsing-only right.

19. The non-transitory recording medium of claim 11, wherein the function of setting further includes a function of setting a manager right.

20. The non-transitory recording medium of claim 11, wherein the function of setting further includes a function of setting an access right.

* * * * *